United States Patent
Cummings et al.

(10) Patent No.: US 10,764,701 B2
(45) Date of Patent: Sep. 1, 2020

(54) SPATIAL AUDIO SYSTEM FOR PLAYING LOCATION-AWARE DYNAMIC CONTENT

(71) Applicant: Plantronics, Inc., Santa Cruz, CA (US)

(72) Inventors: Chase Emerson Cummings, Santa Cruz, CA (US); Collin Robert Brown, Soquel, CA (US)

(73) Assignee: Plantronics, Inc., Santa Cruz, CA (US)

(*) Notice: Subject to any disclaimer, the term of this patent is extended or adjusted under 35 U.S.C. 154(b) by 0 days.

(21) Appl. No.: 16/403,136

(22) Filed: May 3, 2019

(65) Prior Publication Data

US 2020/0037093 A1 Jan. 30, 2020

Related U.S. Application Data

(60) Provisional application No. 62/712,129, filed on Jul. 30, 2018.

(51) Int. Cl.
*H04S 7/00* (2006.01)
*H04S 5/00* (2006.01)

(52) U.S. Cl.
CPC . *H04S 7/30* (2013.01); *H04S 5/00* (2013.01)

(58) Field of Classification Search
CPC ................................. H04S 7/30; H04S 5/00
See application file for complete search history.

(56) References Cited

U.S. PATENT DOCUMENTS

| 3,710,034 A | 1/1973 | Murry |
| 2008/0008326 A1 | 1/2008 | Reichelt et al. |
| 2008/0181438 A1 | 7/2008 | Beckinger et al. |
| 2011/0190913 A1* | 8/2011 | Van De Sluis ......... A63J 17/00 700/94 |
| 2018/0151168 A1 | 5/2018 | Benway et al. |

FOREIGN PATENT DOCUMENTS

JP 2009-517936 A 4/2019

OTHER PUBLICATIONS

Unknown, "Soundscape," Valve Developer Community, Jul. 24, 2018, pp. 1-9, found at URL:https://developer.valvesoftware.com/w/index.php?title=Soundscape&oldid=215959.
PCT International Search Report dated Aug. 2, 2019 in international application No. PCT/US2019/031197, 4 pages.
PCT Written Opinion of The International Searching Authority dated Aug. 2, 2019 in international application No. PCT/US2019/031197, 7 pages.

* cited by examiner

*Primary Examiner* — Mark Fischer
(74) *Attorney, Agent, or Firm* — Slayden Grubert Beard PLLC

(57) ABSTRACT

A method of presenting a soundscape in an environment space using a plurality of controllable speakers arranged the space is provided. A spatial audio engine may access a spatial audio file defining a digital representation of the soundscape, including (a) a plurality of sound elements to be output in the space over time, (b) sound playback location information defining location(s) for each sound element to be output, and (c) timing information defining time(s) for each sound element to be output. The spatial audio engine may also access speaker location information for each speaker in the space. For each sound element to be played in the space over time, the spatial audio engine may correlate the sound playback location information with the speaker location information to identify one or more of the speakers to be controlled to output audio signals associated with the respective sound element.

20 Claims, 4 Drawing Sheets

```
202
{
    {
        "assetGroup": "<asset_group_1>",
        "duration": { // between 2 and 10 seconds
            "range": [
                2,
                10
            ],
            "type": "linear", // linearly random between 2-10
            "units": "s" // seconds
        },
        "frequency": {
            "value": {
                "range": [
                    2,
                    15
                ]
                "type": "linear",
                "units": "m" // minutes,
            }
        },
        "timeframe": {
            "start": "sunrise-30m", // starts at sunrise minus 30 minutes
            "end": "11:42AM", // ends at sunrise plus hours
            "timezone": "local" // defaults to the local timezone
        },
        "group": [
            {
                "assetIndex": "random", // Pick random asset index from entire asset group
                "offset": 0.0,
                "duration": 1.0,
                "easingFunction": "linear",
                "style": {
                    "x": { // randomize x across the entire width of the space
                        "range": [
                            0,
                            1
                        ],
                        "type": "linear" // pick linearly random from between 0 and 1
                    },
                    "y": { // randomize y across the entire width of the space, weighted
                        "range": [
                            0,
                            1
                        ],
                        "type": "sin(x)"
                    }
                }
            }
        ]
    }
}
```

SPATIAL AUDIO SYSTEM FOR PLAYING LOCATION-AWARE DYNAMIC CONTENT

CROSS-REFERENCE TO RELATED APPLICATION

This application claims benefit of U.S. Provisional Patent Application Ser. No. 62/712,129 titled "Spatial Audio System for Playing Location-Aware Dynamic Content," filed Jul. 30, 2018, the disclosure thereof incorporated by reference herein in its entirety.

FIELD OF INVENTION

This invention relates to scenescaping and biophilic design. More specifically, this invention relates to dynamic presentation of spatial media content for creating a scenescape, e.g., the dynamic presentation of spatial audio content for creating a soundscape.

BACKGROUND

This background section is provided for the purpose of generally describing the context of the disclosure. Work of the presently named inventors, to the extent the work is described in this background section, as well as aspects of the description that may not otherwise qualify as prior art at the time of filing, are neither expressly nor implicitly admitted as prior art against the present disclosure.

It is well established that spending time in nature can produce psychological benefits in humans. Thus, habitat soundscaping systems have been developed to simulate aspects of nature to capitalize on these benefits. Traditional soundscaping systems rely on noise generators and/or recurring loops of audio. Such repetition can sound artificial, as well as cause discomfort or fatigue to some listeners over extended periods of times. In addition, conventional soundscaping systems typically play static audio files that produce a uniform sound across an entire space, which does not provide a realistic simulation to immerse or convince a user they are in a natural setting.

One previous attempt at solving these issues was to include non-repetitive sounds in the static audio files themselves, e.g. birds chirping or particularly loud splashes of water. However, these sounds are typically easy for a human to notice, after only a few loops of the audio file. As a result, this exacerbates the issue and decreases user immersion.

Accordingly, there is a need to provide habitat soundscaping systems that are more immersive and comfortable, while reducing the fatigue associated with repetitive sounds of conventional systems.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

The present invention concerns systems and method for generating and presenting scenescapes, (e.g., soundscapes) implementing spatial scene aspects (e.g., sounds) in an environment space.

In one aspect, a method of presenting a scene using a plurality of controllable media output devices arranged in an environment space is provided. The method may include accessing a digital representation of the scene to be presented in the environment space, the digital representation of the scene defining: a plurality of scene elements to be presented in the environment space over time; scene element location information defining a location or range of locations for each scene element to be presented; and timing information defining a time or range of times for each scene element to be presented. The method may further include accessing spatial information for each of the plurality of controllable media output devices, and for each scene element to be presented in the environment space over time: (a) correlating the scene element location information for the respective scene element with the spatial information for the plurality of controllable media output devices to identify one or more of the controllable output devices affected by the respective scene element, and (b) controlling the one or more controllable media output devices affected by the respective scene element to generate a human-perceptible output in the environment space.

This aspect and other aspects of the invention will be apparent from and elucidated with reference to the embodiments described hereinafter.

BRIEF DESCRIPTION OF THE DRAWINGS

FIG. 3 shows one example of a computer-readable representation of an environment space in the form of a JSON text file representing a spatial audio theme for playing birdsong sounds, according to one example implementation;

DETAILED DESCRIPTION

Figure 1:
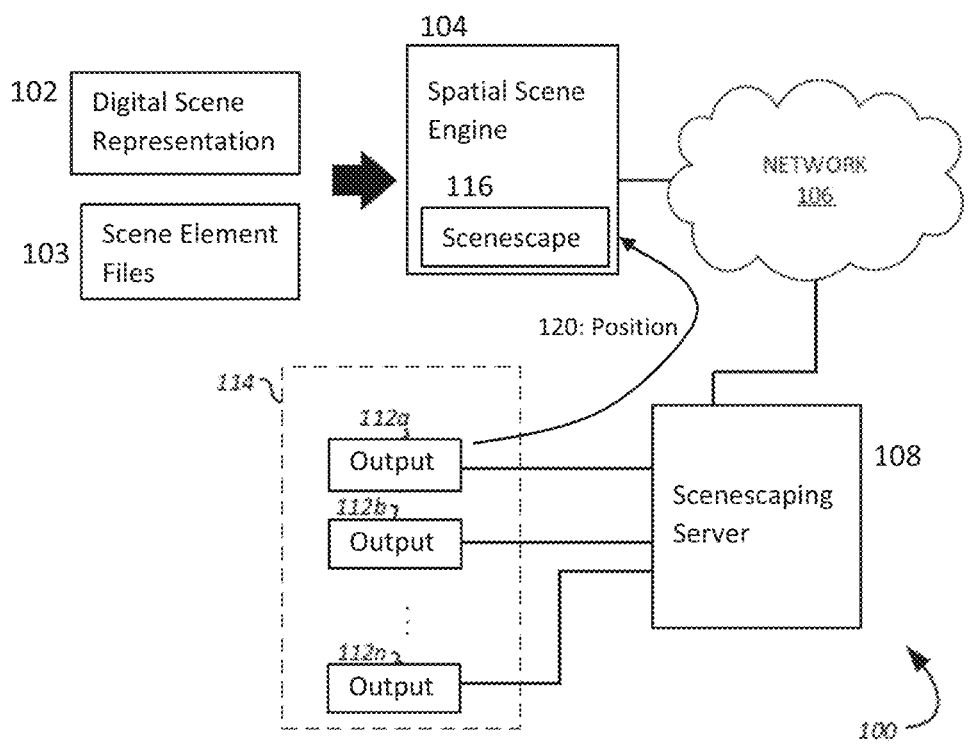
FIG. 1 shows a system for generating and presenting a scenescape implementing spatial scene aspects in an environment space, according to example embodiments of the invention.

Technical features described in this application can be used to construct various embodiments of methods and systems for presenting a scene according to the preceding and following description. Some embodiments of the invention are discussed so as to enable one skilled in the art to make and use the invention.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named elements. For example, a first element is distinct from a second element, and the first element may encompass more than one element and succeed (or precede) the second element in an ordering of elements.

In the following explanation of the present invention according to the embodiments described, the terms "connected to" or "connected with" are used to indicate a data and/or audio connection between at least two components, devices, units, or modules. Such a connection may be direct between the respective components, devices, units, or modules; or indirect, i.e., over intermediate components, devices, units, or modules. The connection may be permanent or temporary; wireless or conductor based.

For example, a data and/or audio connection may be provided over a WAN (wide area network), LAN (local area network), PAN (personal area network), BAN (body area network) comprising, e.g., the Internet, Ethernet networks, cellular networks, such as LTE, Bluetooth (classic, smart, or low energy) networks, DECT networks, ZigBee networks, and/or Wi-Fi networks using a corresponding suitable communications protocol. In some embodiments, a USB connection, a PSTN connection, a line audio connection, a speaker audio connection, a Bluetooth network connection, and/or a DECT connection is used to transmit audio and/or data.

It's well established that spending time in nature can produce psychological benefits in humans. Some available systems aim at providing these psychological benefits also while being indoors. For example, one of the aims of Plantronics' Habitat Soundscaping system is to simulate aspects of nature to capitalize on these benefits by providing an immersive audio scene in a building. It is also conceivable to provide video, adaptive lighting, adaptive climate control (HVAC to adjust temperature, air movement, humidity, pressure) and/or smell to provide an even more realistic simulation of aspects of nature.

Some users of such indoor system however report discomfort, such as when listening to the repetitive and static audio files, including those played by some soundscaping systems. For example, a soundscape may include a collection of several indistinguishable audio files that are typically about 10 minutes long and repeat perpetually. Over long periods of time, users may become fatigued by the sound or pick up on subtle audio queues that give away its repetitive nature, decreasing immersion.

As the present inventors have ascertained, playing one static and uniform sound across an entire space is only the first step toward a realistic simulation of nature and may be inadequate to immerse or convince a user they are in a natural setting.

In a natural setting, one expects to hear and/or see unpredictable noises and/or scenes caused by surrounding animals and the environment itself such as birds chirping, wind blowing through trees, rocks falling into water, or chipmunks scurrying up trees.

The present invention thus aims at providing an improved method of presenting/rendering a scene, e.g., in a building.

In one aspect, a method of presenting a scene using a plurality of controllable media output devices arranged in an environment space is provided. The method may include accessing a digital representation of the scene to be presented in the environment space, the digital representation of the scene defining: a plurality of scene elements to be presented in the environment space over time; scene element location information defining a location or range of locations for each scene element to be presented; and timing information defining a time or range of times for each scene element to be presented. The method may further include accessing spatial information for each of the plurality of controllable media output devices, and for each scene element to be presented in the environment space over time: (a) correlating the scene element location information for the respective scene element with the spatial information for the plurality of controllable media output devices to identify one or more of the controllable output devices affected by the respective scene element, and (b) controlling the one or more controllable media output devices affected by the respective scene element to generate a human-perceptible output in the environment space.

As will be apparent from the preceding, the present aspect provides an improved scene presentation/rendering. In particular, a digital representation of a scene may be defined in terms of scene element location information and timing information, providing granular control of the scene to be presented. This is turn allows to layer a plurality of scene elements on each other, such as for example random acoustic events on top of a continuous base sound in order to more accurately simulate the experience of being in nature.

As used herein, a "digital representation" of a scene may comprise any computer-readable code (e.g., in the form of source code and/or object code) that defines or represents a scene to be presented in an environment space, and may be embodied as software or firmware and organized in files, objects, and/or in any other manner.

As used herein, a "scenescape" or "scene" refers to a collection of perceptible media that can be sensed or experienced by a person or persons at various locations and at various times in an environment space, considered as a whole. Perceptible media may include sounds, lighting, visual images, smells, vibrations, environmental conditions (e.g., temperature, humidity, pressure), or any other type of media or signals that can be sensed, detected, or otherwise experienced by a person. One particular type of scenescape is a soundscape, as discussed in more detail below.

As used herein, the "environment space" associated with a scenescape (e.g., a soundscape) refers to a physical area or other space in which any portion of aspect of the scenescape can be sensed or experienced by a person. In some embodiments, the environment space is an indoor space, i.e., an enclosed space.

As discussed in the preceding, the method according to the present aspect provides presenting a scene using a plurality of controllable media output devices arranged in an environment space. The controllable media output devices may be of any suitable type. For example, the media output devices may comprise one or more of a speaker, a video screen, a video projector, a lighting device, a climate control (HVAC) device, a fan, an (ultrasonic) diffusor, a fountain, any other controllable (smart) building device, or a combination thereof.

The method of the present aspect comprises accessing a digital representation of the scene to be presented in the environment space, the digital representation of the scene defining: a plurality of scene elements to be presented in the environment space over time; scene element location information defining a location or range of locations for each scene element to be presented; and timing information defining a time or range of times for each scene element to be presented.

In the context of the present discussion, a scene element may comprise any media element or signal that can be sensed, detected, or otherwise experienced by a person at a particular location or area in the environment space, e.g., a particular sound, lighting feature, visual image, smell, or environmental conditions (e.g., a particular temperature, humidity, or pressure, or change in any of such parameters), for example.

Scene element location information in this context may comprise at least information about where the respective scene element is to be presented. The scene element location information in some embodiments may comprise absolute scene location information, e.g., longitude/latitude information. In some embodiments, the scene element location information is relative scene location information, e.g., relative to a virtual environment or relative to the environment space.

The aforementioned timing information may comprise any information defining one or more timing parameters that define a time or times for each scene element to be introduced or presented into the environment space. Examples of timing parameters may include a start time, range of possible start times, an end time, range of possible end times, duration, range of durations, or an algorithm for determining (e.g., in a randomized or pseudo-randomized manner) any of the aforementioned example timing parameters, for any particular scene elements to be introduced or presented into the environment space.

The method may further include accessing spatial information for each of the plurality of controllable media output devices, and for each scene element to be presented in the environment space over time: (a) correlating the scene element location information for the respective scene element with the spatial information for the plurality of controllable media output devices to identify one or more of the controllable media output devices affected by the respective scene element, and (b) controlling the one or more controllable media output devices affected by the respective scene element to generate a human-perceptible output in the environment space.

The spatial information for the controllable media output devices in the context of this explanation comprises at least information on the positioning of the respective media output device in the environment space. The spatial information in some embodiments comprises absolute position information for at least some of the media output devices. In some alternative or additional embodiments, the spatial information comprises relative position information for at least some of the media output devices. The relative position information may, e.g., be provided relative to a 2D or 3D reference frame of the environment space. In some embodiments, the relative position information is normalized to a reference frame with a valid numerical range of 0-1.

As discussed in the preceding, the method of this aspect comprises correlating the scene element location information for the respective scene element with the spatial information for the plurality of controllable media output devices to identify one or more of the controllable media output devices affected by the respective scene element. In other words, the scene element location information is mapped to positions of the plurality of controllable media output devices in the environment space so that the correct media output devices render the respective scene element.

In some embodiments, the step of correlating comprises position interpolation between the scene element location information and the spatial positioning of multiple media output devices. For example, in case a sound is to be produced in the environment space at a specific position where no speaker is directly arranged, adjacent speakers are controlled so that the sound appears to come from that specific position.

In some embodiments, the step of correlating comprises mapping between the element location information relative to a virtual environment to spatial positions of the controllable media output devices in the environment space. For example, a digital representation of a scene may be designed for a multitude of environments, so that a position adjustment is necessary to correctly render the respective scene.

In some embodiments, at least one of the location information or timing information provides a randomized, pseudo-randomized, and/or non-repetitive introduction and/or presentation of scene elements over time. For example, while some embodiments may employ any suitable randomization procedure, in some embodiments, a randomization generator provides at least a pseudorandom effect on location and/or timing. The introduction of some randomization, although not necessary, improves the quality of the simulation of nature further increase the feeling of a user to be immersed in a natural setting.

In some embodiments, the digital representation of the scene comprises a computer-readable spatial audio file, e.g., a textual representation of the scene embodied in at least one text file of any suitable format (e.g., JSON, XML, etc.)

In some embodiments, the scene comprises a soundscape, the scene elements comprise sound elements, and the controllable media output devices comprise a plurality of speakers arranged in the environment space. As used herein, the term "soundscape" refers to a collection of sound elements to be output in an environment space, wherein sound elements comprise audible or inaudible sounds that can be heard or otherwise perceived by a person or persons at various locations and at various times in the environment space.

In some embodiments, the scene comprises a soundscape in addition to other scene media information, such as a video scene, a lighting scene, and/or an HVAC scene.

According to another aspect, a method of presenting a soundscape in an environment space using a plurality of controllable speakers arranged in the environment space is provided. The method may include accessing a computer-readable spatial audio file defining a digital representation of the soundscape to be presented in the environment space, the digital representation of the soundscape defining: a plurality of sound elements to be output in the environment space over time; location information defining a location or range of locations for each sound elements to be output; and timing information defining a time or range of times for each sound element to be output. The method may further include accessing speaker location information indicating a spatial location of each controllable speaker in the environment space, and for each sound element to be output in the environment space over time: (a) correlating the location information for the respective sound element with the speaker location information for the plurality of controllable speakers to identify one or more of the speakers affected by the respective sound element, and (b) controlling the one or more speakers affected by the respective sound element to output audio signals associated with the respective sound element.

In some embodiments, at least one of the location information or timing information provides a randomized, pseudo-randomized, and/or non-repetitive presentation of sound elements over time.

With respect to further embodiments as well as to definitions of the terms used in the description of the present embodiment, reference is made to the preceding aspect.

Another aspect provides a system for presenting a scene in an environment space. The system may include a plurality of controllable media output devices arranged in the environment space, and a spatial scene engine including at least one processor. The spatial scene engine may be configured to access a digital representation of the scene to be presented in the environment space, the digital representation of the scene defining (a) a plurality of scene elements to be presented in the environment space by the plurality of controllable media output devices over time, (b) scene element location information defining a location or range of locations for each scene element to be presented, and (c) timing information defining a time or range of times for each scene element to be presented. The spatial scene engine may also be configured to access spatial information for each of the plurality of controllable media output devices, and for each scene element to be presented in the environment space over time: (a) correlate the scene element location information for the respective scene element with the spatial information for the plurality of controllable media output devices to identify one or more of the controllable media output devices affected by the respective scene element, and (b) control the one or more controllable media output devices affected by the respective scene element to generate a human-perceptible output in the environment space.

Another aspect provides a system for presenting a soundscape in an environment space. The system may include a spatial audio engine, a soundscape controller in communication with the spatial audio engine, and a plurality of speakers. The spatial audio engine may include at least one processor configured to access a computer-readable spatial audio file defining a digital representation of the soundscape to be presented in the environment space, the digital representation of the soundscape defining: a plurality of sound elements to be output in the environment space over time; scene element location information defining a location or range of locations for each sound elements to be output; and timing information defining a time or range of times for each sound element to be output. The spatial audio engine may also be configured to access speaker location information indicating a spatial location of each controllable speaker in the environment space, and for each respective sound element: (a) correlate the scene element location information for the respective sound element with the speaker location information for the plurality of speakers to identify one or more of the speakers affected by the respective sound element, and (b) communicate a spatial audio message identifying at least the respective sound element and the one or more affected speakers. The soundscape controller may be configured to, for each respective sound element: receive the spatial audio message identifying at least the respective sound element and the one or more affected speakers; and control each affected speaker to output audio signals associated with the respective sound element.

With respect to further embodiments as well as to definitions of the terms used in the description of the present embodiment, reference is made to the preceding aspects.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows an example system 100 for generating and presenting a scenescape implementing spatial scene aspects in an environment space, according to example embodiments of the invention. As noted above, "scenescape" refers to a collection of perceptible media that can be sensed or experienced by a person or persons at various locations and at various times in an environment space, considered as a whole. Perceptible media may include sounds, lighting, visual images, smells, vibrations, environmental conditions (e.g., temperature, humidity, pressure), or any other type of media or signals that can be sensed, detected, or otherwise experienced by a person.

In some embodiments, including the example embodiments discussed below with reference to FIGS. 2-5, the relevant scenescape is a soundscape, such that the systems disclosed in such figures are configured to generate and present a soundscape implementing spatial audio elements in an environment space, as discussed in detail below.

As shown in FIG. 1, the scenescape implementation system 100 may include a digital scene representation 102 of a physical space 114. The space 114 may include any indoor environment, such as, for example, one or more offices, an open area workspace, and/or rooms in a building, or any outdoor environment. The digital scene representation 102 may comprise a textual representation embodied in at least one computer-readable file of any suitable format (e.g., JSON, XML, etc.) that describes scenescaping for the space 114 by defining various scene elements to be presented in the space and a set of properties linked to each scene element (or group(s) of scene elements) to be presented in the space 114. These properties may include: (1) location—a range of locations in which the scene element may be presented; (2) timeframe—a range of times during which the scene element may be presented; (3) duration—the length of presentation of the scene element; (4) frequency—how often a presentation of the scene element may repeat; (5) size—the area of a space covered by presentation of the scene element; (6) intensity—the intensity (e.g., volume, brightness, size, etc.) at which the scene element is presented; (7) dispersio— how quickly the perceptible detection of the scene element decreases to zero as a person moves away from the location of the presented scene element.

System 100 may also include a number of scene element files 103 (e.g., audio files, lighting control files, video files, etc.), each defining a perceptible form of media configured for output in the space by one or more media output devices 112 arranged in the space 114, e.g., one or more speakers, lights, video sources, fans, HVAC devices, etc. Scene element files 103 may be embodied using any suitable digital protocol(s), and may be called by or otherwise referenced in the digital scene representation file 102. System 100 may include a spatial scene engine or server 104 configured to receive the digital scene representation 102 and relevant scene element files 103, and generate a digital representation of scene elements presented in the space 114, referred to as a scenescape 116. In some embodiments, this digital representation of scene elements, i.e., scenescape 116, is stored entirely in computer memory (RAM), rather than in a file, as generated when needed directly from digital scene representation 102 and scene element files 103 (which are stored as files). In other embodiments, scenescape 116 itself may be stored as a file or group of files, e.g., a files or files generated based on digital scene representation 102 and scene element files 103.

Spatial scene engine or server 104 may include any suitable processor(s) and memory device(s) storing computer-readable code executable by the processor(s) to perform the functions of spatial scene engine or server 104. The spatial scene engine 104 may comprise any suitable hardware (e.g., processor(s) and memory devices), firmware, and/or software for performing the functions discussed herein. In some embodiments, the spatial scene engine 104 may comprise a computer specifically programmed to perform any of the functions disclosed herein. For example, the spatial scene engine 104 may be embodied in a particularly programmed computer server arranged at or proximate the relevant physical space 114. As another example, the spatial scene engine 104 may be embodied as a virtual machine on an existing server at or proximate the physical space 114.

System 100 may also include a scenescaping server 108 in communication with the spatial scene engine 104 via a network 106. The network 106 may include any private and/or public communications network, wired and/or wireless, such as a LAN, wide area network (WAN), and/or the Internet, for example. The network 106 may support standards such as Ethernet, wireless fidelity (Wi-Fi), etc. However, in one or more embodiments, the scenescaping server 108 and the spatial scene engine 104 may reside on a single system.

The scenescaping server 108 may include any device that controls the output of scene element media at one or more media output devices 112 located in the space 114 based on instructions received from the spatial scene engine 104. In some embodiments, scene element files 103 referenced in the digital scene representation 102 may be loaded onto scenescaping server 108, such that scenescaping server 108 may access and play particular files 103 when instructed by the spatial scene engine 104, according to the scenescape 116.

In some embodiments, the scenescaping server 108 may control the output of scene element media at different locations or "zones" within the physical space 114, by controlling output device(s) 112 located at or proximate such locations or zones. Thus, scenescaping server 108 may be also referred to as a "zone controller." The scenescaping server/zone controller 108 may comprise any suitable hardware (e.g., processor(s) and memory devices), firmware, and/or software for performing the functions discussed herein. For example, scenescaping server/zone controller 108 may be embodied in a particularly programmed computer server arranged at or proximate the relevant physical space 114. As another example, the scenescaping server/zone controller 108 may be embodied as a virtual machine on an existing server at or proximate the physical space 114. In some embodiments, scenescaping server 108 comprises an audio zone controller embodied as a low-powered computer configured for running audio processing on eight output channels and two input channels. In other embodiments, the scenescaping server 108 may be embodied by Apple TV (e.g., with audio output capability) or similar system. In other embodiments, the scenescaping server 108 may be embodied by a specialized computer system, e.g., including one or more DSPs, FPGAs, etc. specifically designed or programmed to provide the audio output and input capabilities and functionality disclosed herein. The instructions are sent by the spatial scene engine 104 based on the scenescape 116 generated from the digital scene representation 102 and scene element files 103. In this way, the spatial scene engine 104 may add and remove scene elements to the space 114 based on constraints imposed by their associated properties in the digital scene representation 102. Accordingly, the scenescape 116 presented via the media output devices 112 can change over time in a highly dynamic manner, e.g., as discussed in greater detail with respect to the example soundscapes described below.

For example, in some embodiments, a spatial scene engine 104 may be store or have access to a digital scene engine representation file 102 embodied as JSON data that includes references/calls to various scene element files 103. The spatial scene engine 104 may include processor(s) configured to access and execute the JSON data 102 and send a message to scenescaping server 108 whenever a scene element file 103 is referenced/called in the execution of the JSON data 102, which message may indicate the particular scene element file 103 and parameters for outputting the scene element file 103 in the physical space 114 as defined in the JSON data 102 (e.g., location/zone to output the scene element, volume, intensity, duration, etc.). The scenescaping server 108 may then access the particular scene element file 103, e.g., from local memory, from memory of the spatial scene engine 104, or from an external system, and control one or more media output devices 112 to output the particular scene element file 103.

In some embodiments, the scenescape 116 may be designed (e.g., using appropriate computer code) such that scene elements (e.g., sounds, lighting effects, etc.) are introduced and/or presented in the environment space with at least some degree of randomness, pseudo-randomness, or non-repetitiveness over time, with respect to at least one scene element property, such as the start time, duration, location(s), intensity, etc. of particular scene elements introduced into the environment space over time.

The spatial scene engine 104 may be configured to implement randomness, pseudo-randomness, and/or non-repetitiveness regarding the introduction and/or presentation of scene elements in any suitable manner. For example, the spatial scene engine 104 may utilize any suitable technique to implement random or pseudo-random behavior in a continuous manner or a discrete manner, e.g., as discussed in more detail below with reference to FIG. 2, regarding the introduction of sound elements by a spatial sound engine.

Figure 2:
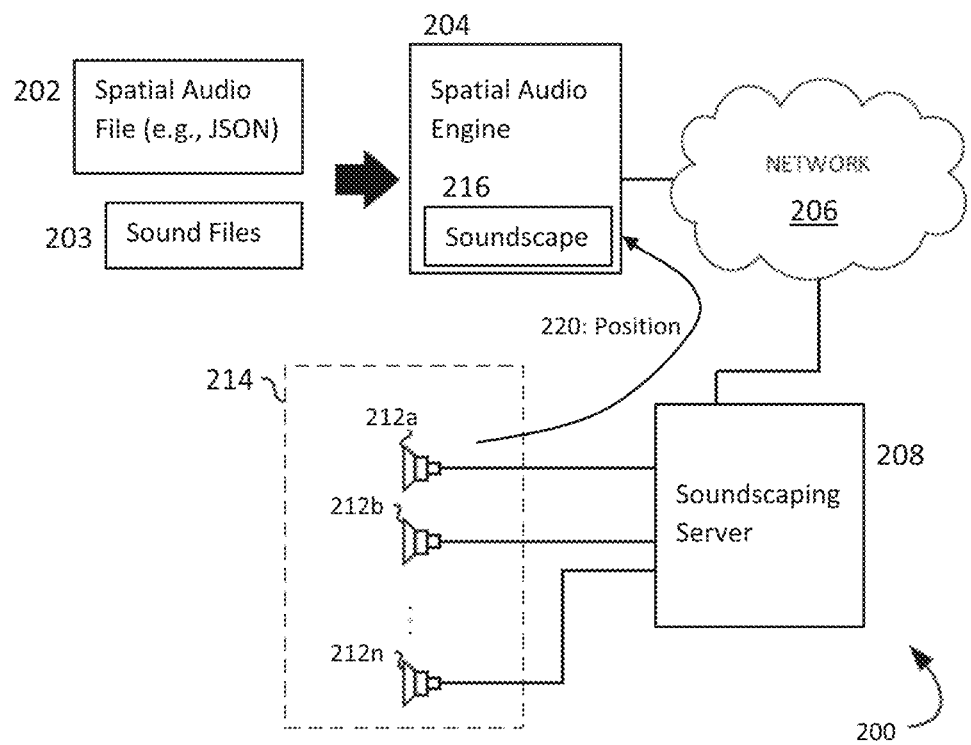
FIG. 2 shows a system for generating and presenting a habitat soundscape implementing spatial audio aspects, according to example embodiments of the invention.

FIG. 2 shows a system 200 for generating and presenting a habitat soundscape implementing spatial audio aspects, according to example embodiments of the invention. Thus, system 200 represents one example implementation of system 100 discussed above. Although the elements of the system 200 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 2 may be omitted, repeated, and/or substituted. Accordingly, various embodiments may lack one or more of the features shown. For this reason, embodiments of the invention should not be considered limited to the specific arrangements of elements shown in FIG. 2.

As shown in FIG. 2, the system 200 includes a computer-readable textual representation 202 of a physical space 214. The space 214 may include any indoor environment, such as, for example, one or more offices, an open area workspace, and/or rooms in a building, or any outdoor environment. The computer-readable textual representation 202 may include at least one computer-readable file of any suitable format (e.g., JSON, XML, etc.) that describes soundscaping for the space 214 by defining various sound elements to be presented in the space and a set of properties linked to each sound element (or group(s) of sound elements) to be presented in the space 214. These sound element properties may include: (1) location—a range of locations in which the sound may be placed; (2) timeframe—a range of times during which the sound may play; (3) duration—the length of the sound; (4) frequency—how often the sound may repeat; (5) size—the area of a space covered by the sound; (6) volume—the volume at which to play the sound; (7) dispersion—how quickly volume decreases to 0 as a listener moves away from the sound. The computer-readable textual representation 202 is also referred to herein as a spatial audio file 202.

System 200 may also include a number of sound files (audio files) 203, each defining the audio for one or more sounds that can be output in the space, e.g., water sounds, wind sounds, bird sounds, other animal sounds, other nature sounds, or any other type of sounds. Sound files 203 may be called by or otherwise referenced in spatial audio file 202. In some embodiments, sound files 203 may comprise .wav files, .mp3 files, .wma files, .ogg files, or any other type(s) of audio files.

System 200 may include a spatial audio engine or server 204 configured to receive the computer-readable textual representation (spatial audio file) 202 and relevant sound files 203, and generate a digital representation of sounds playing in the space 214, referred to as a soundscape 216. Spatial audio engine or server 204 may include any suitable processor(s) and memory device(s) storing computer-readable code executable by the processor(s) to perform the functions of spatial audio engine or server 204. In some embodiments, this digital representation of sounds, i.e., soundscape 216, is stored entirely in computer memory (RAM), rather than in a file, as generated when needed directly from a spatial audio file 202 and sound files 203. In other embodiments, soundscape 216 itself may be stored as a file or group of files, e.g., a files or files generated based on spatial audio file 202 and sound files 203.

In some embodiments, spatial audio engine 204 may be configured to correlate the location for playing each sound, as defined in the spatial audio file 202, with a spatial map that indicates the respective locations of speakers within the space 214, to (a) identify one or more speakers to play a respective sound file, and in some embodiments, (b) to calculate playback parameters (e.g., volume, direction, tone, etc.) for each speaker, e.g., using mathematical interpolation techniques, in order to provide the desired sound at the desired location specified in the spatial audio file 202.

The spatial audio file 202 for the relevant soundscape may specify random, pseudo-random, and/or non-repetitive introduction and/or presentation of one, some, or all sound elements in the environment space. For example, the spatial audio file 202 may specify a random, pseudo-random, and/or non-repetitive component for at least one sound property of at least one sound element specified in the spatial audio file 202. Thus, for example, particular nature sounds included in a soundscape may be introduced and/or presented at random, pseudo-random, and/or non-repetitive times, locations, and/or intensities within the environment space of the soundscape, to eliminate or reduce the possibility of listeners noticing a repeating pattern of sounds. As another example, the spatial audio file 202 may select the particular sound file that is called and played when introducing a particular sound element into the space in a random, pseudo-random, and/or non-repetitive manner. For instance, the spatial audio file 202 may specify that each time a particular sound element (e.g., Bird Sound 2) is to be added to the environment space, a particular audio file is randomly selected form a group of 15 different bird sound audio files.

The spatial audio engine 204 may be configured to implement randomness, pseudo-randomness, and/or non-repetitiveness regarding the introduction and/or presentation of sound elements in any suitable manner. For example, the spatial audio engine 204 may utilize any suitable technique to implement random or pseudo-random behavior in a continuous manner or a discrete manner. "Continuous" randomness may be used for selecting numeric values within a range. For example spatial audio engine 204 may select the "x" position of a sound to be introduced from a range of values between 0.0 and 0.5, select the volume of a sound to be introduced from a range of values between −12dBFS and 0dBFS, or select a delay before beginning to play a particular audio file from a range of values between 1 and 3 hours. A specific example of an implementation of continuous randomness is provided at lines 4-11 of the example JSON text file shown in FIG. 3 (discussed below).

In addition, or alternatively, the spatial audio engine 204 may implement "discrete" randomness for selecting one element among a set of several possible values. For example, a spatial audio file 202 (e.g., JSON) may specify the introduction of a bird sound at a defined recurring play time, and specify a selection from among three different bird sound files to play at each instance of the play time. The spatial audio file 202 may specify any suitable manner for selecting the particular sound file to play at each play time, for example, by looping through the three bird sound files in a specified order; or by performing a randomly selecting from the three bird sound files at each play time; or by randomly selecting from among the files that have yet to be played, and resetting after all three files have been selected once.

System 200 may also include a soundscaping server 208 in communication with the spatial audio engine 204 via a network 206. The network 206 may include any private and/or public communications network, wired and/or wireless, such as a LAN, wide area network (WAN), and/or the Internet, for example. The network 206 may support standards such as Ethernet, wireless fidelity (Wi-Fi), etc. However, in one or more embodiments, the soundscaping server 208 and the spatial audio engine 204 may reside on a single system.

The soundscaping server 208 may include any device that controls the output of audio at one or more speakers 212 located in the space 214 based on instructions received from the spatial audio engine 204. The instructions are sent by the spatial audio engine 204 based on the soundscape 216 generated from the spatial audio file 202 and sound files 203. For example, for each sound to be introduced to the space 214, the spatial audio engine 204 may determine and notify the soundscaping server of (a) a particular sound file 203 to be played, (b) one or more speakers 212 to play the sound file 203, and/or (c) playback parameters (e.g., volume, direction, tone, etc.) for each individual speaker 212 in order to provide the desired sound at the desired location specified in the spatial audio file 202. In this way, the spatial audio engine 204 may add and remove sounds to the space 214 based on constraints imposed by their associated properties in the spatial audio file 202. Accordingly, the soundscape 216 played by the speakers 212 can change over time in a highly dynamic, non-repetitive manner. In some embodiments, sound files 203 referenced in the spatial audio file 202 are pre-loaded onto soundscaping server 208, such that soundscaping server 208 may access and play particular sound files 203 when instructed by the spatial audio engine 204. In other embodiments, the soundscaping server 208 may access sound files 203 from an external data storage system.

For example, by way of the spatial audio file 202, a specific group of birdsong sounds (each defined by a respective sound file 203) may be constrained spatially to one half of the space 214 and temporally from one hour before sunrise until noon. Further, the volume may vary up to 50% and the frequency may be some value between 5 and 30 minutes. Within the given timeframe, the spatial audio engine 204 may add arbitrary birdsong sounds of varying volume to the soundscape with a frequency such that no two sounds are separated by less than 5 minutes or more than 30 minutes.

FIG. 3 shows a specific example of the computer-readable textual representation (spatial audio file) 202 in the form of a JSON text file representing a spatial audio theme for playing birdsong in the morning. In this example, a randomly selected sound file 203 from a specific group of birdsong sound files 203 (i.e., asset_group_1) may play for between 2-10 seconds every 2-15 minutes. Further, the time at which such sounds may play is temporarily limited to between 30 minutes before sunrise to 11:42 A M, based on the local time zone. Still further, the location at which such sounds may be played in the space 214 is selected at random from across the entire space 214.

Returning to the spatial audio system 200 of FIG. 2, the soundscape 216 is communicated from the spatial audio engine 204 to the soundscaping server 208 via instruction to render sounds at the speakers 212. To do this, the soundscaping server 208 may subscribe to any number of arbitrary points (locations) within the space 214 represented by the soundscape. The soundscaping server 208 may be configured to register and manage these subscription, including identifying all points affected by any change in the soundscape 216 (e.g., any addition or removal of a sound from the soundscape 216) and notifying all subscriptions at the affected points. Conversely, soundscaping server 208 may not notify subscriptions at points unaffected by a change in the soundscape 216 (addition or removal of a sound).

A given notification may contain all data the soundscaping server 208 needs to play or stop playing a sound at one or more specified speaker 212. Such data may include the exact audio file 203, volume, duration and source location. The location at which to play the sound may be determined by the spatial audio engine 204, and may be the point at which the soundscaping server 208 subscribed to receive notifications. In the case that a subscription exists some distance away from the source location of a sound, the volume value provided in the notification data may be scaled to take into account a specified dispersion of the sound.

In other words, the soundscaping server 208 may subscribe to the location of each speaker 212 in the space 214. When a given subscription receives a notification from the spatial audio engine 204, the sounds being played out of its corresponding speaker 212 are changed to reflect the new state.

Figure 4:
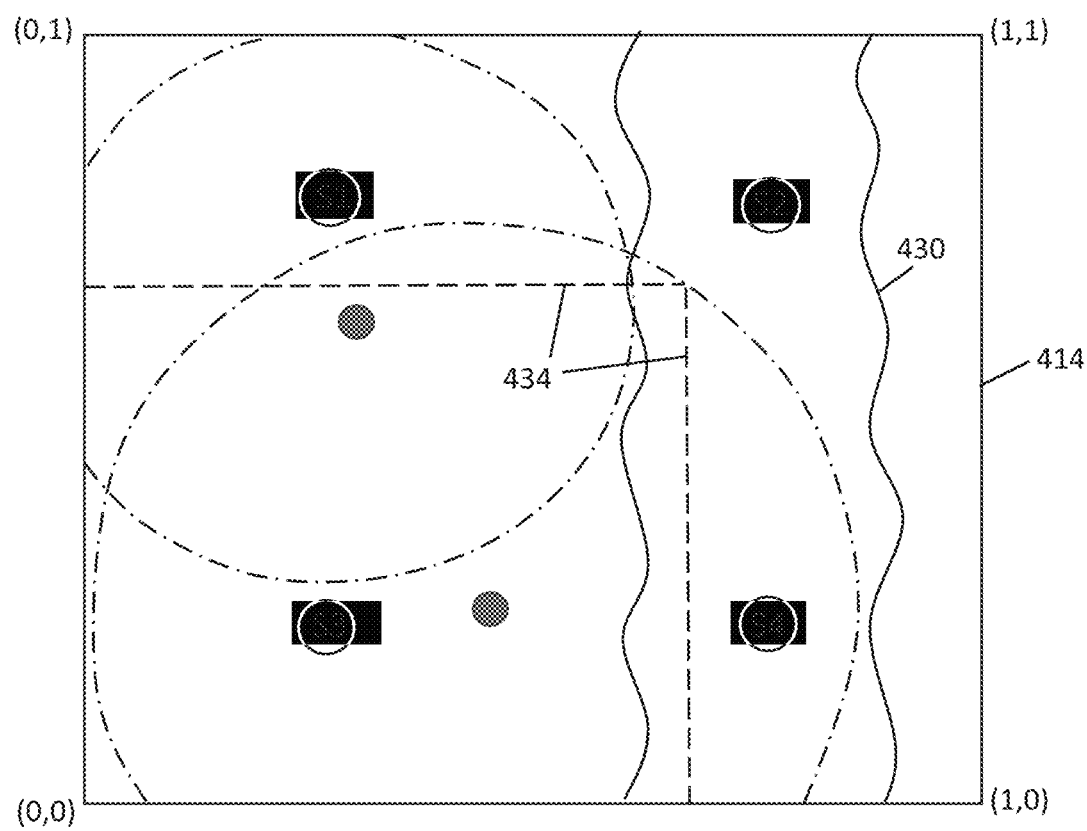
FIG. 4 shows an example implementation of a habitat soundscape implementing spatial audio aspects, according to one example embodiment.

FIG. 4 shows an example wherein a space 414 contains four speakers S1, S2, S3, and S4 positioned at scaled locations (0.25, 0.25), (0.75, 0.25), (0.75, 0.25), and (0.75, 0.75). Each speaker subscribes to events at its location.

A river 430 is placed running down the right side of the space 414. Accordingly, in an initial state, running water audio is played out of speakers S2 and S4 based on their locations. A group of bird sounds is constrained to the area defined within boundary lines 434 (the lower left area of space 414). The parameters of both may be defined in a spatial audio file 202. The spatial audio engine 204 may generate a soundscape 216 representing the space 414 based on such spatial audio file 202 and related audio files 203 referenced or called by the spatial audio file 202.

After some time, the system plays a bird noise at the location (0.45, 0.25) with a dispersion of 0.35 which is shown by the lower red dashed radius. This sound is determined to affect speakers S3 and S4, so an event is sent to each of their subscriptions. Because speaker S3 is closer than speaker S4 to the event origin, the volume of the bird sound is played louder by speaker S3 than by speaker S4. At a later time, another bird sound is played at the location (0.3, 0.6) with a dispersion of 0.2, shown by the higher red dashed radius. This sound only affects only a single speaker S1 because of the location and dispersion, and leaves the other speakers unaffected. A soundscaping server receives these events and plays the specified audio through the corresponding speakers S1-S4 at appropriate volume.

Figure 5:
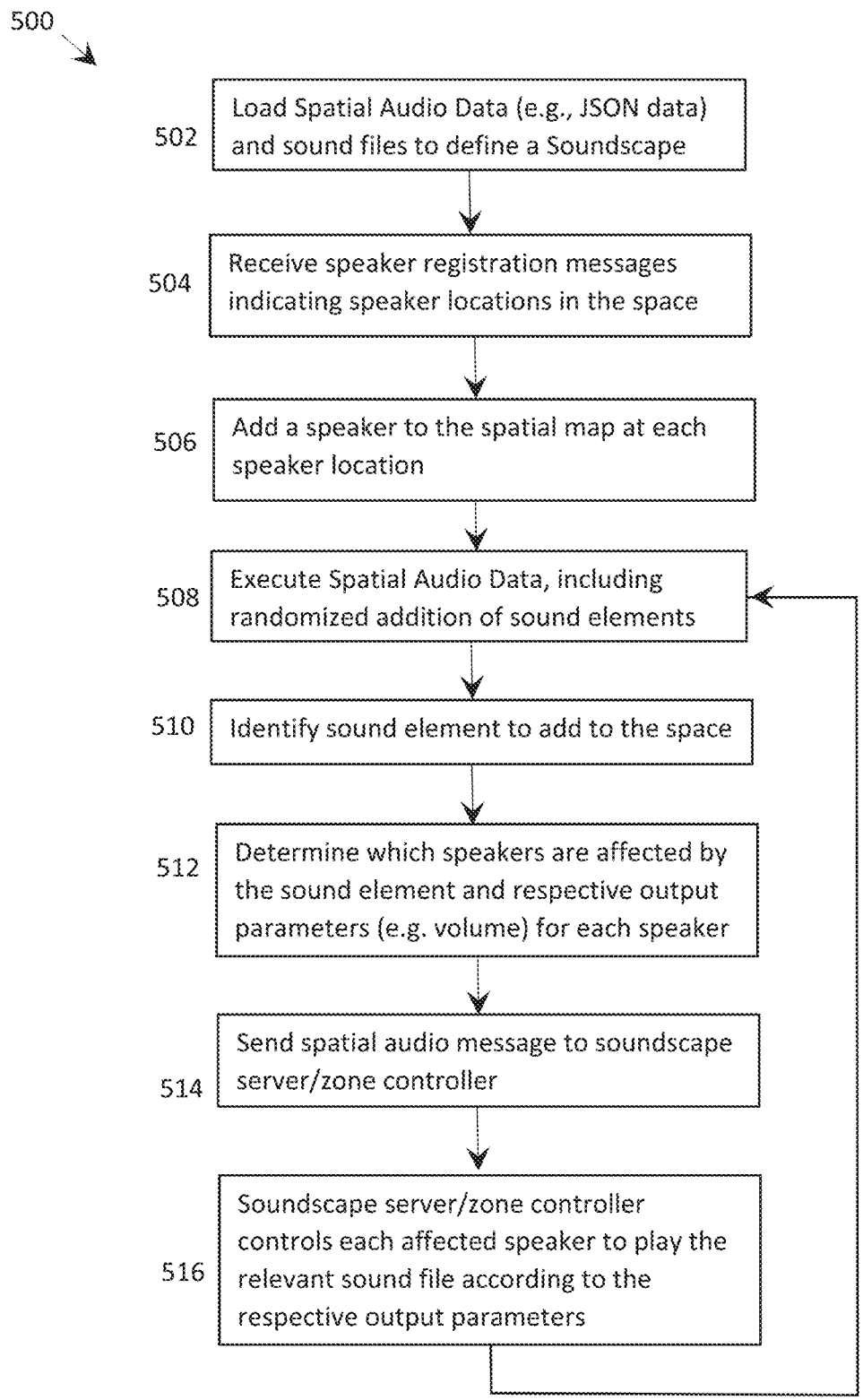
FIG. 5 is a flowchart of an example method for generating and presenting a habitat soundscape implementing spatial audio aspects, according to example embodiments of the invention.

FIG. 5 is a flowchart of an example method 500 for generating and presenting a habitat soundscape implementing spatial audio aspects, according to example embodiments of the invention. Method 500 may be implemented, for example, by system 200 shown in FIG. 2. Thus, the following description relates to an implementation of method 500 by system 200; however, it should be understood that method 500 may be implemented by any other suitable system.

At 502, a computer-readable textual representation (spatial audio file) 202 of an environment space 214, e.g., embodied as JSON (JavaScript Object Notation) spatial audio data, is loaded or communicated to a spatial audio engine 204. The spatial audio JSON data 202 may identify or include calls to a number of sound elements, e.g., using the filenames of particular sound files 203, which files 203 may be loaded onto or otherwise accessible to soundscaping server 208. The spatial audio JSON data 202 and sound files 203 collectively define a soundscape 216 to be presented by system 200.

At 504 (which may occur before, during, or after step 502), the spatial audio engine 204 may receive or access information identifying the respective locations of a number of speakers 212 arranged in the space 214. In some embodiments, this may be performed via a speaker registration message 220 communicated from each respective speaker 212 to the spatial audio engine 204, or through an intermediary soundscaping server 208 (e.g., a speaker zone controller), which may send a collective speaker registration message 220 for all speakers 212 in the space. The speaker registration message(s) 220 may indicate the location (e.g., x and y coordinates; or x, y, and z (height) coordinates, for example), the orientation (e.g., direction the speaker is facing), or any other positional information of each speaker 212 in the space 214. Such location, orientation, or positional information may be relative to any known coordinate system or any other reference point, location, or space.

In some embodiments, a speaker installer may set the position of each speaker during installation (e.g., by inputting coordinate and orientation information into an input device at the speaker 212, at the soundscaping server 208 or other communication hub, or via an input device at any other device communicatively connected to the spatial audio engine 204 or soundscaping server 208. In one embodiment, each speakers may register its position with the spatial audio engine 204 or soundscaping server 208 at the time of installation and/or at subsequent times or intervals as defined by the system, so that the spatial audio engine 204 and/or soundscaping server 208 may maintain an updated registry of location data for all speakers 212 currently arranged in the space 214.

At 506, the spatial audio engine 204 may add a representative speaker element to a spatial map of the space 214 at each respective speaker location, based on the data received at 504.

At 508-516, the system 200 may implement the soundscape 216 in the space 214.

At 508, the spatial audio engine 204 may begin to execute the spatial audio JSON data 202 to introduce and control the presentation of sound elements into the environment space, according to the various rules and parameters defined in the spatial audio JSON data 202. In some embodiments, this includes controlling the introduction and/or presentation of particular sound elements in a random, pseudo-random, and/or non-repetitive manner, with respect to one or more sound elements properties of each respective sound elements, e.g., as discussed herein.

At 510, the spatial audio engine 204 may identify a sound element to introduce into the space at the present time, as defined by the spatial audio file 202. The spatial audio engine 204 may also identify and access the corresponding sound file(s) 203 for the sound element, e.g., as also defined by the spatial audio file 202.

At 512, the spatial audio engine 204 may determine which speakers 212 are affected by the sound element to be implemented, and (in some embodiments or situations) respective output parameters (e.g. volume, pitch, tone, bass, treble, etc.) to be output by each affected speaker 212, to provide the desired audio effect to listeners in the relevant area. In some embodiments, to determine which speaker(s) 212 are affected by each sound element to be implemented, the spatial audio engine 204 must correlate (a) the location/area to which the sound element is to be introduced, as defined by the spatial audio file 202 with (b) the respective locations of speaker elements in space 214 as defined by the spatial map generated at steps 504-506. In instances in which the sound element location defined by the spatial audio file 202 falls between multiple (e.g., 2, 3, or more) speakers, the spatial audio engine 204 may (a) identify the multiple speakers to play the sound element and (b) calculate one or more playback parameters (e.g., volume, direction, tone, etc.) for each individual speaker, e.g., by mathematical interpolation, in order to produce the desired sound at the location defined by the spatial audio file 202.

At 514, the spatial audio engine 204 may send a spatial audio message to the soundscape server/zone controller 208 identifying or including the relevant sound file(s), affected speaker(s) 212, and (if relevant) respective output parameters for each speaker 212. At 516, the soundscape server/zone controller then controls each affected speaker 212 to play the relevant sound file(s) according to the respective output parameters for each respective speaker 212. Then method then returns to step 508 to process the next sound element to introduce into the space, at the relevant time as defined by the spatial audio file 202.

With the spatial audio system described above, soundscaped environments become more immersive for users, and the discomfort experienced by some users due to repetitive audio is reduced.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method of presenting a scene using a plurality of controllable media output devices, which controllable media output devices are in a distributed arrangement throughout an environment space, which environment space is a physical area or other space in which any portion or aspect of the scene can be sensed or experienced by a person, the method comprising:
    accessing a digital representation of the scene to be presented in the environment space, the digital representation of the scene defining:
        a plurality of scene elements to be presented in the environment space over time;
        scene element location information defining a location or range of locations for each scene element to be presented; and
        timing information defining a time or range of times for each scene element to be presented;
    accessing spatial information for each of the plurality of controllable media output devices, which spatial information at least comprises a spatial map that indicates respective locations of the controllable media output devices distributed throughout the environment space;
    for each scene element to be presented in the environment space over time:
        correlating the scene element location information for the respective scene element with the spatial map for the plurality of controllable media output devices to identify one or more of the controllable media output devices affected by the respective scene element based on the locations of the controllable media output devices in the environment space; and
        controlling the one or more controllable media output devices affected by the respective scene element to generate a human-perceptible output in the environment space.

2. The method of claim 1, wherein at least one of the location information or timing information provides a random, pseudo-random, or non-repetitive presentation of scene elements over time.

3. The method of claim 1, wherein the scene comprises a soundscape.

4. The method of claim 1, wherein the digital representation of the scene comprises a computer-readable spatial audio file.

5. The method of claim 1, wherein the scene elements comprise sound elements, and the controllable media output devices comprise a plurality of speakers arranged in the environment space.

6. The method of claim 1, wherein the controllable media output devices comprise lighting devices.

7. The method of claim 1, wherein the controllable media output devices comprise video playback devices.

8. The method of claim 1, wherein the controllable output devices comprise HVAC devices.

9. The method of claim 1, further comprising:
    calculating, for each of the one or more controllable media output devices identified to be affected by the respective scene element, different output parameters for different individual ones of the controllable media output devices; and
    controlling the one or more controllable media output devices affected by the respective scene element based on the different output parameters for the different individual ones of the controllable media output devices.

10. A non-transitory computer-readable medium including contents that are configured to cause a processing device to conduct the method of claim 1.

11. The method of claim 1, wherein the scene simulates aspects of nature in the environment space.

12. The method of claim 1, wherein the step of correlating comprises position interpolation between the scene element location information and spatial positioning of multiple media output devices.

13. The method of claim 1, wherein the digital representation of the scene is a computer-readable textual representation of the scene.

14. The method of claim 1, wherein in an initialization step, registration messages are received from the plurality of controllable media output devices, which registration messages comprise at least the location of the controllable media output device in the environment space.

15. The method of claim 14, wherein the registration messages are used to maintain the spatial map of the controllable media output devices.

16. A method of presenting a soundscape in an environment space using a plurality of speakers, which speakers are in a distributed arrangement throughout the environment space, which environment space is a physical area or other space in which any portion or aspect of the soundscape can be sensed or experienced by a person, the method comprising:

accessing a computer-readable spatial audio file defining a digital representation of the soundscape to be presented in the environment space, the digital representation of the soundscape defining:
a plurality of sound elements to be output in the environment space over time;
location information defining a location or range of locations for each sound elements to be output; and
timing information defining a time or range of times for each sound element to be output;

accessing a spatial map indicating a spatial location of each speaker distributed throughout the environment space;

for each sound element to be output in the environment space over time:
correlating the location information for the respective sound element with the spatial map for the plurality of speakers to identify one or more of the speakers affected by the respective sound element based on the locations of the controllable media output devices in the environment space; and
controlling the one or more speakers affected by the respective sound element to output audio signals associated with the respective sound element.

17. The method of claim 16, wherein at least one of the location information or timing information provides a random, pseudo-random, or non-repetitive presentation of sound elements over time.

18. The method of claim 16, further comprising:
calculating, for each of the one or more speakers identified to be affected by the respective sound element, different output parameters for different individual speakers; and
controlling the one or more speakers affected by the respective sound element based on the different output parameters for the different individual speakers.

19. A non-transitory computer-readable medium including contents that are configured to cause a processing device to conduct the method of claim 16.

20. A system for presenting a scene in an environment space, the system comprising:
a plurality of controllable media output devices, which controllable media output devices are in a distributed arrangement throughout the environment space, which environment space is a physical area or other space in which any portion or aspect of the scene can be sensed or experienced by a person; and
a spatial scene engine including at least one processor configured to:
access a digital representation of a scene to be presented in the environment space, the digital representation of the scene defining:
a plurality of scene elements to be presented in the environment space by the plurality of controllable media output devices over time;
scene element location information defining a location or range of locations for each scene element to be presented; and
timing information defining a time or range of times for each scene element to be presented;
access spatial information for each of the plurality of controllable media output devices, which spatial information at least comprises a spatial map that indicates respective locations of the controllable media output devices distributed throughout the environment space; and
for each scene element to be presented in the environment space over time:
correlate the scene element location information for the respective scene element with the spatial map for the plurality of controllable media output devices to identify one or more of the controllable media output devices affected by the respective scene element, based on the locations of the controllable media output devices in the environment space; and
control the one or more controllable media output devices affected by the respective scene element to generate a human-perceptible output in the environment space.

* * * * *